(12) United States Patent
Leal Monteiro

(10) Patent No.: US 11,244,052 B2
(45) Date of Patent: Feb. 8, 2022

(54) HOST COMPUTER SECURITIZATION ARCHITECTURE

(71) Applicant: Vladimir Mickael Leal Monteiro, Saint Jean de Fos (FR)

(72) Inventor: Vladimir Mickael Leal Monteiro, Saint Jean de Fos (FR)

(*) Notice: Subject to any disclaimer, the term of this patent is extended or adjusted under 35 U.S.C. 154(b) by 601 days.

(21) Appl. No.: 16/178,704

(22) Filed: Nov. 2, 2018

(65) Prior Publication Data
US 2019/0075020 A1    Mar. 7, 2019

Related U.S. Application Data

(63) Continuation-in-part of application No. 16/097,439, filed on Oct. 29, 2018.

(30) Foreign Application Priority Data

| | | |
|---|---|---|
| Apr. 29, 2016 | (FR) | ........................... 1653910 |
| May 2, 2017 | (WO) | ................. PCT/FR2017/051051 |
| May 2, 2018 | (WO) | ................. PCT/FR2018/051090 |

(51) Int. Cl.
*H04L 29/06* (2006.01)
*G06F 21/56* (2013.01)
(Continued)

(52) U.S. Cl.
CPC .......... *G06F 21/567* (2013.01); *G06F 16/182* (2019.01); *G06F 16/27* (2019.01);
(Continued)

(58) Field of Classification Search
CPC ............... H04L 41/0806; H04L 9/0838; H04L 61/1511; H04L 2209/38
(Continued)

(56) References Cited

U.S. PATENT DOCUMENTS

| | | |
|---|---|---|
| 8,402,528 B1 | 3/2013 | McCorkendale et al. |
| 8,732,482 B1 | 5/2014 | Melvin |

(Continued)

FOREIGN PATENT DOCUMENTS

EP    1 313 290 A1    5/2003

OTHER PUBLICATIONS

ISR; European Patent Office; NL; dated Aug. 9, 2018.
(Continued)

*Primary Examiner* — Evans Desrosiers
(74) *Attorney, Agent, or Firm* — Patshegen IP LLC; Moshe Pinchas

(57) ABSTRACT

The host computer securitization architecture, which comprises:
  an offline source server,
  an offline provisioning server configured to connect with a portable mobile securitization server via a wired communication,
  an administration server configured to monitor and interact with at least one portable mobile securitization server,
  at least one portable mobile securitization server configured to connect via a wired communication to a host computer, said portable mobile securitization server comprising:
    a connector to mechanically connect and establish a removable wired communication between the mobile server and the host computer,
    a first wired bidirectional communicator with the host computer,
    a second of bidirectional communicator with a data storage peripheral or a data network and
    a unit securing the communication between the host computer and the data storage mobile server or the (Continued)

data network, this communication being established between the first and the second communicator, a blockchain comprising a block identifying each source-code, provisioning, administration and portable mobile securitization server.

19 Claims, 6 Drawing Sheets

(51) Int. Cl.
| | |
|---|---|
| H04L 29/12 | (2006.01) |
| G06F 21/32 | (2013.01) |
| G06F 21/82 | (2013.01) |
| G06F 21/55 | (2013.01) |
| H04W 12/128 | (2021.01) |
| G06F 16/27 | (2019.01) |
| G06F 16/182 | (2019.01) |
| H04L 9/08 | (2006.01) |
| H04L 9/32 | (2006.01) |
| H04L 12/24 | (2006.01) |
| G06F 21/81 | (2013.01) |
| G06F 21/85 | (2013.01) |
| G06F 21/86 | (2013.01) |

(52) U.S. Cl.
CPC .............. *G06F 21/32* (2013.01); *G06F 21/55* (2013.01); *G06F 21/81* (2013.01); *G06F 21/82* (2013.01); *G06F 21/85* (2013.01); *G06F 21/86* (2013.01); *H04L 9/0838* (2013.01); *H04L 9/3226* (2013.01); *H04L 9/3239* (2013.01); *H04L 9/3247* (2013.01); *H04L 41/0806* (2013.01); *H04L 41/24* (2013.01); *H04L 61/1511* (2013.01); *H04L 63/0227* (2013.01); *H04L 63/0236* (2013.01); *H04L 63/0861* (2013.01); *H04L 63/107* (2013.01); *H04L 63/20* (2013.01); *H04W 12/128* (2021.01); *H04L 2209/38* (2013.01); *H04L 2209/80* (2013.01)

(58) Field of Classification Search
USPC .......................................................... 726/1
See application file for complete search history.

(56) References Cited

U.S. PATENT DOCUMENTS

| | | | |
|---|---|---|---|
| 10,586,062 B1 * | 3/2020 | Rangan | G06F 21/64 |
| 2014/0090046 A1 * | 3/2014 | Touboul | H04L 63/1416 |
| | | | 726/12 |
| 2014/0337558 A1 * | 11/2014 | Powers | G06F 9/45558 |
| | | | 710/313 |
| 2016/0110567 A1 | 4/2016 | Rooyakkers et al. | |

OTHER PUBLICATIONS

ISR; European Patent Office; NL; dated Jul. 4, 2017.
GSM—Security and Encryption; Nov. 20, 2012; https://web.archive.org/web/20121120092735/https://www.tutorialspoint.com/gsm/gsm_security.htm.

* cited by examiner

HOST COMPUTER SECURITIZATION ARCHITECTURE

INVENTION TECHNICAL FIELD

The present invention pertains to a portable communication mobile server, a protection system for a host computer and a communication method. It notably applies to Information Technology security and, specifically, to the subdomain of data privacy during mobile use of an Information Technology terminal.

BACKGROUND OF THE INVENTION

In the Information Technology security field, particularly for enterprises, SMEs and consumers who value privacy, administrations or organizations the data of which is sensitive, it is customary to advise against or even prohibit the use of personal computers by the personnel outside the enterprise's own data network. Indeed, such a data network, within the enterprise structure, is normally protected by a firewall that defends all the computers, within this network, from malicious attempts at information technology piracy.

Indeed, unsecured access to the internet, whether wired or wireless, entail, for instance, significant risks of intrusion or misdirection. Examples of such unsecured accesses typically comprise public Wi-Fi hotspots located in train stations, hotels or airports. The use of information technology in general involves risks. In a company's premises there is a little risk control, risks are contained within the company's premises, and via dedicated tools (server room, routers, firewalls, and identified internet connection). When travelling, the risks of intrusion are multiplied tenfold and can have several sources and origins.

For instance, attacks in the "man-in-the-middle" category aim at rerouting the data traffic coming from a terminal, to a server not-desired by the user of the terminal because of the replacement of the DNS tables (also known as "Domain Name Server") at the terminal level. These attacks are particularly common in Operating Systems such as Windows (Registered Trademark), and these Operating Systems do not have built-in capabilities to guard against these attacks organically.

To date, there is no reliable and mobile solution, to provide secured access to unsecured networks for laptop computers.

Similarly, during a data transfer to and from a data storage mobile server and a mobile computer, the terminal can be infected by a malicious software, and, in turn, infect the entire network to which the computer belongs.

Thus, to date, when data must me carried on a mobile server in the USB key category, (USB is also known as "Universal Serial Bus") or a hard drive to be protected, the usual recourse is encoding, which one can consider as a passive data protection. This protection is characterized as passive because it is not capable of detecting any intrusion attempt and is not capable of adapting in case of intrusion.

In case of theft of the storage mobile server, after a certain amount of computational time of a pirate terminal, the encoding key ends up being decoded, resulting in the data being accessible by those in possession of the key.

To date, there is no solution both reliable and mobile, to provide secured access to a resource of a data storage mobile server for laptop computers.

Furthermore, USB mobile servers present risks specific to their nature. Indeed, the USB standard's main advantage lies in its immediacy and "plug and play". This advantage has turned this technology in the most commonly used standard for data exchange between computers and mobile servers.

However, this technology also presents piracy risks, the mobile server or the computer, can each be potentially infected by a malware designed to propagate a virus. Such malware sometimes transmit data from the key to the terminal or vice-versa without the user's knowledge.

To date, there is no solution both reliable and mobile, to provide secured access to a USB mobile server for laptop computers.

OBJECT OF THE INVENTION

The present invention purpose it to remedy all or part of these drawbacks.

To that end, a first aspect of the present invention aims at a host computer securitization architecture, which comprises:
 an offline source server,
 an offline provisioning server configured to connect with a portable mobile securitization server via a wired communication,
 an administration server configured to monitor and interact with at least one portable mobile securitization server,
 at least one portable mobile securitization server configured to connect via a wired communication to a host computer, said portable mobile securitization server comprising:
  a connector to mechanically connect and establish a removable wired communication between the mobile server and the host computer,
  a first wired bidirectional communicator with the host computer,
  a second of bidirectional communicator with a data storage peripheral or a data network and
  a unit securing the communication between the host computer and the data storage mobile server or the data network, this communication being established between the first and the second communicator,
 a blockchain comprising a block identifying each source-code, provisioning, administration and portable mobile securitization server.

This makes the architecture secure against security risks linked to wireless data network usage.

In particular embodiments, at each step of configuring a portable mobile server:
 a block on the blockchain, representative of the configured portable mobile server, is updated with identifiers representative of the configuration performed on the portable mobile server and
 a portable mobile server signature, representative of the an identifier of the updated block, is stored in the portable mobile server.

In particular embodiments, during preparation of a portable mobile server:
 the source server provides the portable mobile server with programmable code and unique identifiers and creates a block, representative of the portable mobile server on the blockchain, comprising at least one unique identifier,
 the provisioning server provides the portable mobile server with execution parameters and unique identifiers and provides the portable mobile server block with at least one identifier and execution parameter as well as provides the portable mobile server with a signature corresponding to its block identifiers and the administration server provides the portable mobile server with further execution parameters and unique identifiers and provides the portable mobile server block with at least one identifier and execution parameter, thus altering a block hash and identifier as well as the portable mobile server signature.

In particular embodiments, electronic circuits of the portable mobile servers are immerged in a blackout varnish, impermeable and insulating.

In particular embodiments, a portable mobile server comprises at least three pins stemming from the electronics and protruding from the varnish, as well as conducting wires distributed randomly between at least two pins, and an electromagnetic insulating and electrically conducting resin embedding the electronics, wires, varnish and pins.

In particular embodiments, a portable mobile server comprises an electric resistance measurement unit configured to measure the resistance between the two pins linked by the randomly distributed wires on one hand and between two pins not linked by randomly distributed wires on the other hand, such resistance measurements being stored on the blockchain at initialization of the portable mobile server.

In particular embodiments, a portable mobile server comprises a self-destruct mechanism triggered by the electric resistance measurement unit when at least one of the measured resistances exceeds a difference threshold between the value measured and the initially stored values on the blockchain.

In particular embodiments, a portable mobile server comprises a electrical power storage unit connected to at least one electronic circuit of the mobile server and configured, when electricity is transmitted to each said circuit, to cause the destruction of each said circuit.

In particular embodiments, the electricity stored in the storage unit is transmitted to each said circuit depending on a command received via the second communicator.

In particular embodiments, the electricity stored in the storage unit is transmitted to each said circuit when a detector to detect an integrity anomaly of the mobile server detects the presence of an integrity anomaly.

In particular embodiments, the means of anomaly detection is, at least in part, mechanical or optoelectrical.

In particular embodiments, the electricity stored in the storage unit is transmitted to each said circuit when a means of detection at least in part, implemented in software.

In particular embodiments, during the detection of a first anomaly, the mobile server is deactivated logically, and during the detection of a second anomaly, subsequent to the first anomaly, the electricity stored in storage unit is transmitted to each electronic circuit of the mobile server to be destroyed.

In particular embodiments, a portable mobile server comprises a memory of crypted data.

In particular embodiments, a portable mobile server comprises a decryptor for decrypting the information stored in the memory depending on a decryption key.

In particular embodiments, a portable mobile server comprises a receptor for reception of a decryption key coming from the host computer.

In particular embodiments, a portable mobile server comprises a receptor for reception of a decryption key coming from a distant server.

In particular embodiments, a portable mobile server comprises a receptor for reception of a first decryption key coming from the terminal and a second key coming from a distant server and a pair configurator of pairing the two keys to form a hybrid decryption key utilized by the decryptor.

In particular embodiments, a portable mobile server comprises a geo-locator for geo-localizing the mobile server, the decryptor being configured to function depending on the localization information supplied by the means of geo-localization and geo-localization data associated with the data stored in the memory.

In particular embodiments, the provisioning server is configured to provide to a portable mobile server at least one element of the following list:
  a connection identifier,
  an encryption protocol,
  a user attribution,
  a knowledge-base, comprising for instance, a DNS server identifier or a set of private connection codes for an organization,
  a block value in a blockchain and/or
  a path to a target administration server.

These provisions allow to make the mobile server inoperable in case of, for instance, loss, theft or attempt of intrusion in the housing.

BRIEF DESCRIPTION OF THE DRAWINGS

Other advantages, purposes and specific characteristics of the invention will appear from the following non-exhaustive description of at least one specific embodiment of the device, of the system and process, objects of the present invention, regarding the drawings in annex, in which.

DESCRIPTION OF SAMPLE EMBODIMENTS OF THE INVENTION

The present description is not meant to be exhaustive; each characteristic of an embodiment can advantageously be combined with any other characteristic of any other embodiment.

In particular, the means presented next to each embodiment of the mobile server can be integrated to any other embodiment of the mobile server.

It is to be understood immediately that the drawings are not to scale.

What is called a "host computer", is a device comprising a processing unit and a man-machine interface allowing the control of the processing unit. This host computer may or may not comprise a wired or wireless connector to a data network 105.

Figure 1:
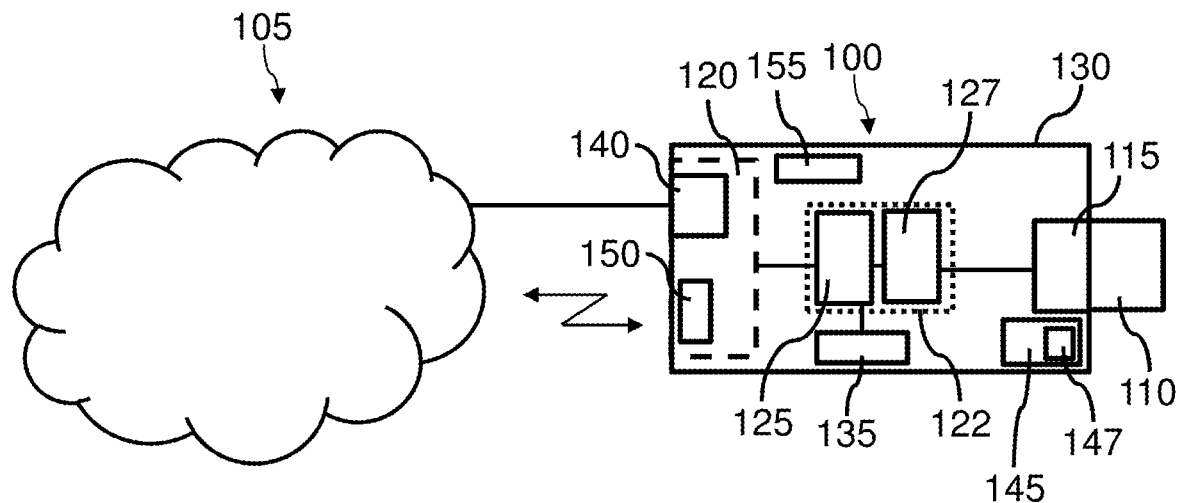
FIG. 1 represents, schematically, a first specific embodiment of the mobile server, object of the present invention

FIG. 1 depicts a schematic view of an embodiment of the mobile server 100, object of the present invention. This portable mobile server 100 featuring, among other functionalities, a communication with a data network 105 operating under the internet protocol, comprises:
- a connector 110 to mechanically connect and establish a removable wired communication between the mobile server and the host computer,
- a first means 115 of wired bidirectional communication with the host computer,
- a second means 120 of bidirectional communication with a data network and
- a unit 122 securing the communication between the host computer and the data network, this communication being established between the first and the second means of communication, the means of communication and the security unit being embedded in a single housing 130 removable from the host computer.

The data network 105 implemented here is the network called "Internet", the architecture of which is broadly documented in prior art and in numerous publications of reference, is not described here.

The mobile server 100 is configured to be connected to the data network 105 in all commonly used fashions, whether with a wire or wirelessly.

In those variants where the mobile server 100 connects with a wire, the second means of communication 120 of the mobile server 100 comprises an Ethernet connector 140. This connector 140 is, for instance, an Ethernet female connector configured to connect to a cord called "RJ45". In certain variants, the connector 140 comprises both the female connector and a cord (not referenced) to connect to a female connector of the data network 105.

In the case of variants where the mobile server 100 connects wirelessly, the second means 120 of communication comprises an antenna 150 operating in compliance with the standard IEEE802.11 called "Wi-Fi". Wi-Fi antennae are largely described both in prior art and in specialized reference material, their implementation and operation details are not depicted here.

In variants, not depicted here, where the mobile server 100 connects wirelessly, the second means of communication 120 comprises an antenna 150 operating in compliance with the Bluetooth (registered trademark) standard. Bluetooth antennae are largely described both in prior art and in specialized reference material, their implementation and operation details are not depicted here.

This antenna 150 is configured to connect to a wireless access point (not represented here) of the data network 105. The data and parameters transferred to establish a connection between the mobile server 100 and the access point depend on the implementation specifics of the Wi-Fi or Bluetooth standards at this particular access point.

In certain variants, the second means of communication 120 comprises both a wired connection and an antenna for wireless connectivity to the data network 105.

In certain variants, the second means of communication 120 comprises:
- multiple wired connectors and/or
- multiple wireless antennae.

The mobile server 100 is connected to the host computer via the connector 110. The nature of this connector 110 depends on the nature of at least one port of the target host computer when the mobile server 100 is being designed.

Preferably, this connector 110 is a male connector defined by the standard USB (also known as "Universal Serial Bus") configured to be inserted in a female USB port of the terminal.

Preferably, the connector 110 also to power the module, which strengthens the portability of the mobile server 100.

Furthermore, the host computer can have a code and a secret request that the host computer makes when connecting to accept or not the mobile server 100, and vice versa, the mobile server 100 can make a request to the computer to identify it.

The mobile server can be paired with its host computer host by an administration server which provides a part of an authentication code to both the mobile server and the host computer. This pair can then be stored on a blockchain or distributed ledger technology so that the mobile server, once first paired with the host computer host exchange parts of the authentication code by a private algorithm that the mobile server generated in order to recognize the terminal host. Mobile server can add to blockchain this pairing key for a multi factor recognition.

This connector 110 physically links the mobile server 100 to the host computer, and concurrently, allows establishing a communication between this terminal and the mobile server 100.

In variants, the mechanical connector 110 and the communication link between the host computer and the mobile server are distinct entities.

The mobile server 100 communication with the host computer is made via the operation of the first means of communication 115.

The first means of communication 115 is for instance a network board associated with the USB connector of the mobile server 100.

The security unit 122 is an electronic circuit comprising at least one of the following elements:
- a firewall 125 filtering packets received from the data network meant to be transmitted to the host computer comprising a processing unit configured to execute a firewall software and
- a system 127 of autonomous DNS management.

The first means 115 and the second means 120 of communication can thus be located on each end of the firewall 125. This firewall 125 operates in compliance with predetermined security governance or policies set during the manufacturing of mobile server 100 and, potentially, during the connection of the mobile server 100 to a secure server (not represented here) of the manufacturer of mobile server 100.

This firewall 125 structurally functions like any existing firewall and already broadly described in reference publications.

The DNS management system 127 (DNS being also known as "Domain Name Server"), comprises a registry of name translations into addresses on the data network 105. This system 127 is predetermined during the initialization of the mobile server 100 and is potentially updated upon the connection of the mobile server 100 to a secure server (not represented here) of the administrator of mobile server 100. This system 127 is defined independently from any operating system.

In a certain operating mode, the DNS management system 127 allow the direct acquisition of the address of a domain name for a transmission.

In another operating mode, the DNS management system 127 compares a recorded address corresponding to a domain name with a domain address received from an external DNS activated by the data network. If these two addresses are different, the communication with the data network can be interrupted due to security concerns.

In such operating modes, the device checks the veracity of the DNS addresses provide through dynamic, cross-analyses, algorithms and statistics at the same time.

In such operating modes:

When the user inputs a request for a specific website on a computers' web browser, the web browser asks a DNS server on the Internet what the IP address of the website is then the DNS server sends the IP address corresponding to the website requested to the computer emitting the request.

In the case of Man-in-the-middle hacking, the hacker interposes himself between the user's terminal and the DNS server (usually between the Wi-Fi terminal and Internet access point) and at the request of the browser answers instead of the DNS server with a false IP address.

The security unit 122 interprets the request made by the browser from the host terminal to the DNS server, At this point the security unit 122 makes cross analyses: the security unit 122 checks if the IP address of the website request is already stored inside a memory of the mobile server 100. Such storage can correspond to an IP address table updated by an administration server enriched by the results of previous successful DNS requests as well as, potentially, by the results of previous successful DNS requests of other mobile servers associated to said mobile server 100 on a blockchain.

In this scenario, all the certified matching domain name/IP addresses are not only stored on an administration server, but also on the mobile servers, and each match being added at their blockchain. Furthermore, preferably wrong matches are also stored on a blockchain, with specific information concerning the problem as IP address of a hotspot, the connection context and some other specific information in order to alert next mobile servers that can connect at that compromised connection.

Preferably, if no IP address is stored within the memory of the mobile server 100, the security unit 122 compares the response received from the DNS server, with the result of a reverse request sent to an administration server (preferably through a secure encrypted channel). In such a reverse request, the security unit 122 requests the name associated to the IP address received from the DNS server.

In case of a match between these results, the mobile server 100 provides the IP address request's response to the browser of the host computer, In case of difference, the mobile server 100 can either alert the user and block the communication or alert the user and provide another IP address or other measures.

In parallel, the mobile server 100 preferably uploads the information to the administration server and can store it in his blockchain.

This embodiment can further be linked to the tracking system that the mobile server 100 sends to its administration server when it starts its internet connection so that the server can analyze if the connection is secure or not including among other things if there has been a previous attempt to attack from this location.

Means 115 and 120 of communication and security unit 122 are embedded in the unique housing 130 removable from host computer. Preferably, this housing 130 is designed to be hand-carried.

In preferential embodiments such as the one depicted in FIG. 1, the mobile server 100 comprises, inside the removable housing 130, a means 135 of geo-localizing the mobile server, the firewall 125 being configured to block any received packet when the mobile server location is not within a predetermined geographical area.

The geo-localization is, for instance, a beacon operating in compliance with the GPS system (also known as Global Positioning System). The predetermined geographical area is stored in a memory component (not depicted here) of the mobile server 100 during the manufacturing process of the mobile server 100, and is potentially updated upon the connection of the mobile server 100.

In preferential embodiments such as the one depicted in FIG. 1, the mobile server 100 is configured to transmit, upon connection to the host computer, a deactivation command via a wireless means of communication of the host computer.

This command is initiated by a processing unit of the mobile server 100 and transmitted via the means 115 of communication. In certain embodiments, not depicted here, the mobile server 100 comprises a means of edifying a Virtual Private Network (also known as VPN) with a device on the data network 105.

This means of edification is, for instance, a software embedded in a processing unit of the mobile server 100. This means of edification utilizes any known VPN protocol, in the OpenVPN, SSTP, L2TP or IPSEC. The protocol selection can be predetermined, user-defined or set via the mobile server 100.

In case the protocol is automatically set by the mobile server 100, this mobile server 100 comprises a means of identification of communication type and a means of evaluating the mobile server 100 environment. Depending on this data, the mobile server selects a communication protocol.

"Protocol" refers to the terminal that the mobile server 100 is connected to, the networks that the terminal 100 is connected, the frequency of connection to these networks, the connection type selected for instance. This environment can be complemented by supplemental data transmitted by a server and/or the user. This environment allows the mobile server 100 to generate models of risk factors and, preferably, to improve them over time via automatic machine learning. The mobile server 100 therefore accumulates its own specific experiences, and the automatic learning allowing the mobile server 100 to make decisions different from that of another mobile server 100.

Thus, in certain variants, the anomaly detection is strengthened by an automatic learning of anomaly detection on a mobile server 100 or a distant server.

In certain variants, the mobile server 100 features the capability of switching protocol mode during a communication if the mobile server 100 detects anomalies via a means of anomaly detection. In case of serious anomaly detection, translating into a risk of intrusion, the mobile server 100 interrupts the communication. Here, "anomaly" means a situation considered as unusual by the mobile server from a security point of view.

In embodiments such as the one depicted in FIG. 1, the mobile server comprises:

an electronic lock 145 preventing the mobile server to operate and a means 147 of unlocking lock 145.

The means of unlocking 147 is for instance a biometric identification system, a retina identification system or a fingerprint identification system for instance.

In certain variants, the means of unlocking 147 is a communication chip utilizing a near-field wireless communication technology (also known as NFC), Bluetooth (registered trademark), or RFID (also known as Radio Frequency Identification).[U1]

In these variants, a third-party device, such as a communicating host computer, must be located in the proximity of mobile server 100 so that the mobile server 100 functions. This communicating host computer emits a signal incorporating a password or an identifier corresponding to a password or identifier registered by the lock 145.

In certain variants, the unlocking process comprises an additional step of secondary password entry, transmitted to the user via a second means of communication such as a cellular phone network for instance, on the terminal. Such a two-step verification is initiated, for instance, if the initially entered password matches an unlocking password of the mobile server. Such a two-step verification mechanism is well-known and already in use, for instance, for access to cloud services.

In some embodiments, the second means of communication is configured, when an internet connection is established, to:
obtain the mobile server identification from a data server,
get the mobile server update files, the mobile server being configured to auto-update depending on the received files and
transmit, to the server, information depicting the path taken, by a packet sent by the second means of communication, to reach the server,
the server being configured to validate or invalidate the connection depending on the path information transmitted.

The path information corresponds, for instance, to a function called "traceroute" allowing the identification of the cascade of routers between the mobile server and the server. In that way, if the path router corresponds to a router as malicious by the server, an identifier of said router being stored in a table of banned routers, for instance, the connection is invalidated.

In certain embodiments, the second means 120 of communication is configured, once an internet connection is validated, to establish a data tunnel between the server and the mobile server.

This data tunnel is established, for instance, via a VPN connection (VPN also known as Virtual Private Network).

In certain embodiments, the housing volume is smaller than thirty-five cubic centimeters.

In certain embodiments, the housing volume is smaller than fifty cubic centimeters.

In certain embodiments, the mobile server comprises a battery 155 to supply power to the mobile server electronic circuits.

In certain embodiments, the electronic circuits of the mobile server are configured to receive power supply from the first means of power supply.

In certain embodiments, the mobile server electronic circuits are configured to receive power supply from the first means of power supply.

This power is supplied, for instance, via the power supply bus of a USB port operated via the second means 115 of communication.

In certain preferential embodiments, the mobile server establishes the communication between the communicating terminal and internet in the following fashion:

the mobile server is connected to the terminal,
the mobile server sends a query to a DNS sever known to the mobile server, this query comprising a path information of the "traceroute" type,
the server validates the query, and a tunnel is created between the server and the mobile server and
the server can access the internet via this tunnel.

FIGS. 4 through 8 depict other embodiments of the mobile server object of the present invention.

Figure 4:
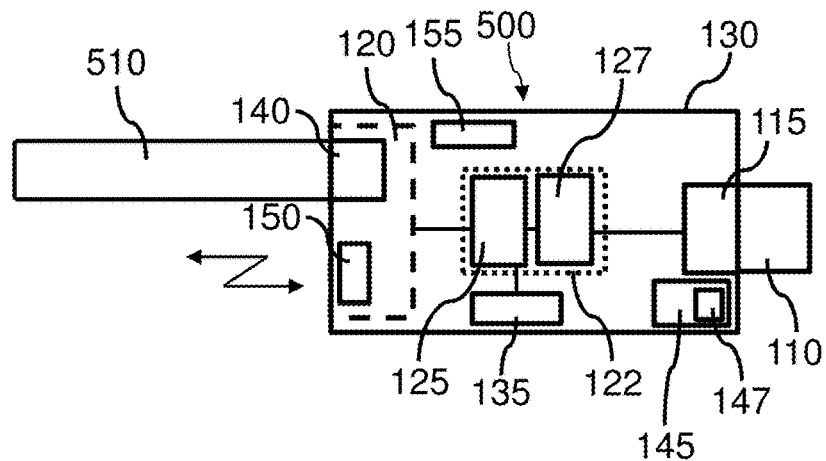
FIG. 4 represents, schematically, a second specific embodiment of the mobile server, object of the current invention.

FIG. 4 depicts a specific embodiment of Portable communication mobile server 500 with a USB data storage mobile server comprising:
a connector 110 to mechanically connect and establish a removable wired communication between the mobile server and a host computer,
a first means 115 of wired bidirectional communication with the host computer,
a second means 120 of bidirectional communication with a data storage mobile server, the second means of communication comprising a USB connector 510 and
a unit 122 securing the communication between the host computer and the data storage mobile server, this communication being established between the first and the second means of communication,
the means of communication and the security unit being embedded in a unique housing (130) removable from the host computer.

"Mobile server utilizing the USB standard" means any device that can potentially be connected to a USB port of the host computer. This device can be:
a man-machine mobile server such as a keyboard or a mouse,
a storage mobile server such as external hard-drive, camera, multimedia player and USB key,
a multimedia and imaging mobile server such as printers, scanners, sound cards, webcams, TV tuners, secondary screens or microphone or
a network adapter.

In this embodiment, the security unit 122 protects from intrusions or data leaks like an airlock would do. More specifically, upon connection of the USB mobile server to the portable mobile server 500, the plug & play feature is halted because the portable mobile server is not a terminal. The entirety of the content and functionality of the USB can be accessed through the terminal by filtering all communications between the terminal and the mobile server.

For instance, the portable mobile server functions as follows:

A first pass read of the mobile server by the terminal 500 only reads the directory structure with the sole purpose of identifying the its comprised files (filename, type, size, date) without opening the files. This results in annihilating any intrusion attempt from a malware or virus located either on the terminal of the USB mobile server. The user is then free to either use the mobile server, each information transmitted by this mobile server being analyzed by the protection mobile server 500.

In the case of a USB storage mobile server, the user can open, on his terminal, a file explorer, browsing the files stored in the USB mobile server. The user can then identify the file he or she wishes to use and launch its scanning directly on the protection mobile server 500 via verification tools (anti-virus, anti-malware, document codes . . . ) embedded or accessed from the distant server. This analysis utilizes:

a means of protecting the content transmitted by the USB mobile server, such as an embedded anti-virus or anti-malware software and/or a means of transmission, to a server embedding such a means of protection.

Once the file is cleared via the analysis, the user can download it from the mobile server 500 to his or her terminal, and only this file is copied, blocking any attempt from a malware or virus hidden on the USB mobile server. To transfer the file from the terminal to the USB mobile server, the same type of analysis is implemented. This allows to apply to the terminal and mobile server file the same degree of protection that would be used for an internet transmission.

The display of the USB mobile server content is made via reading the directory tree, and not the file contents as on the internet. Information are displayed for the user; information needs to be this information to view its content. The content display in the mobile server is for instance performed via an internet browser of the terminal.

That way, inserting a file in or extracting it from the USB mobile server is carried out like a download or upload of file from the internet.

Once this analysis is completed, the file is cleared, by the mobile server 500, for risk-free utilization by the terminal and the user. All this aims at verifying and limiting the hazard profile of the file before it reaches the terminal.

Note that all characteristics described next to FIGS. 1 through 3 and 5 through 8 are compatible with this embodiment.

Figure 5:
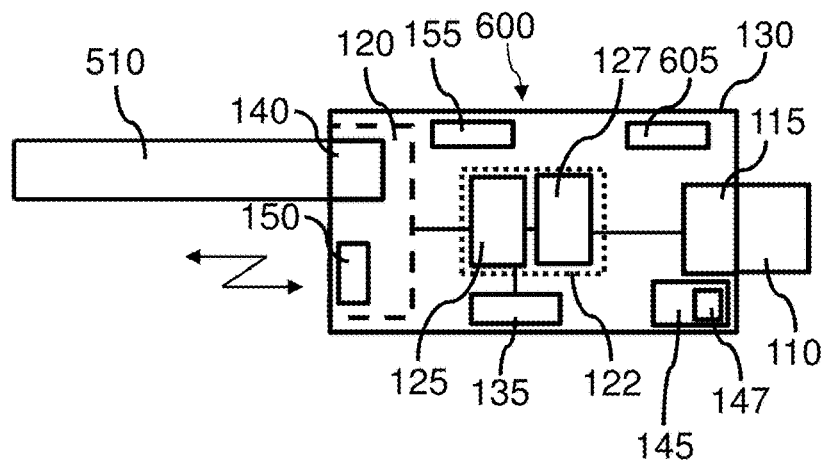
FIG. 5 represents, schematically, a third specific embodiment of the mobile server, object of the current invention.

FIG. 5 depicts a particular embodiment of the portable mobile server 600 communicating with the storage mobile server or with a data network 105 utilizing the internet protocol, comprising:

a connector 110 to mechanically connect and establish a removable wired communication between the mobile server and the host computer, a first means 115 of wired bidirectional communication with the host computer, a second means 120 of bidirectional communication with a data storage mobile server or a data network 105 utilizing the internet protocol, a unit 122 securing the communication between the host computer and the data storage mobile server or the data network, this communication being established between the first and the second means of communication, the transmission being established the first and the second means of communication and a means 605 of authorizing the mobile server activation configured to activate the mobile server when an information determined by the means authorization matches a predetermined authorization data.

the means of communication and the security unit being embedded in a single housing 130 removable from the host computer.

In certain embodiments, the means of authorization 605 utilizes:

a means of password entry such as a keyboard or a touchscreen for instance, a near-field communication configured to receive data via the Bluetooth technology, a sensor for a user's biometrics and/or the first means of communication to receive an identifier from the host computer, so that it only functions if the terminal is paired with the mobile server for instance.

Note that all characteristics described next to FIGS. 1 through 4 and 6 through 8 are compatible with this embodiment.

Figure 6:
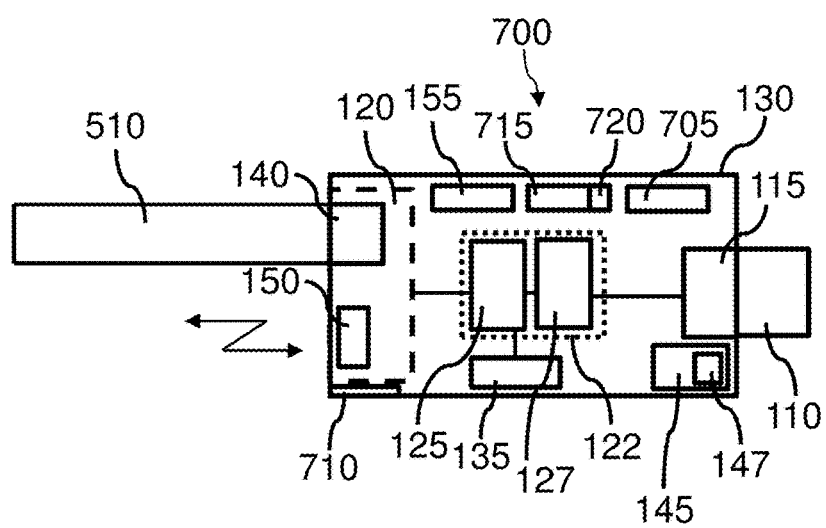
FIG. 6 represents, schematically, a fourth specific embodiment of the mobile server, object of the current invention.

FIG. 6 depicts a specific embodiment of the portable mobile server 700 communicating with a data storage mobile server or with a data network 105 utilizing the internet protocol, comprising:

a connector 110 to mechanically connect and establish a removable wired communication between the mobile server and the host computer, a first means 115 of wired bidirectional communication with the host computer, a second means 120 of bidirectional communication with a data storage mobile server or a data network 105 and a unit 122 securing the communication between the host computer and the data storage mobile server or the data network, this communication being established between the first and the second means of communication and a unit 705 of electricity storage connected to at least one electronic circuit of the mobile server and configured, when electricity is transmitted to each said circuit, to cause the destruction of each said circuit.

the means of communication and the security unit being embedded in a single housing 130 removable from the host computer.

The storage unit 705 is, for instance, comprised of condensers charged with a voltage greater than the operating voltage of the circuits of the mobile server, so that the electricity discharge causes the destruction of the circuits.

In certain embodiments, the electricity stored in the storage unit 705 is transmitted to each said circuit depending on a command received via the second communication method 120. This command is received, for instance, in lieu of update files.

In certain embodiments, the electricity stored in the storage unit 705 is transmitted to each said circuit upon the determination, by a detection means 710 of integrity anomaly of the mobile server, of the presence of an integration anomaly or a risk of intrusion.

To determine the presence of a risk, the mobile server 700 utilizes for instance an embedded software means 710 of detection detecting a number of attempts to decode or access the mobile server content protected by the mobile server 700. When this number is greater than a determined threshold, over a defined period of time, the stored electricity is transmitted to the to circuits of the protected mobile server.

The detection of a risk of physical intrusion, also called integrity risk, can also be performed via a means of detection 710 of mechanical detection such a switch, or optoelectrical or sensor for instance. This means 710 is preferably sunk in resin, preventing any access or visual, electrical or electromagnetic identification of these means of detection. Indeed, the resin can then possess characteristics designed to block electromagnetic emissions.

The detection of a risk of logical intrusion, resulting from a wired connection (USB or Ethernet for instance) or wireless (Bluetooth, WiFi, NFC) is performed via software. The mobile server 700 thus comprises a means of detection 710 counting for instance the number of attempted access on one or several ports of the mobile server 700 or the number of passwords tested by a third device.

In variants, the means of detection 710 comprises both a software and a mechanical component.

For instance, the mobile server 700 logs a given number of operation parameters of the mobile server 700. Depending on these parameters, le mobile server 700 is capable of determining a risk of intrusion. This functionality is for instance of the following type: when at least one parameter has a determined value over a determined length of time, a risk of intrusion is detected. The means of determining a risk of intrusion can be strengthened by machine-learning algorithms.

The means of determination of risks of intrusion logs for instance the communication access points and the server that connects to the mobile server 700. Preferably, the mobile server 700 stores these logged events, and accumulates experience in addition to operations parameters and parameters utilization and thresholds deemed as acceptable for the mobile server 700. As such, the mobile server 700 can initially be paired with one or more trusted terminals, as well as one or multiple environments that it logs. Subsequently, the successive stored logs allow edifying a reference base of situations which allow, over time, to improve the offline experience. Indeed, when online, the mobile server 700 is connected to a server can assist the mobile server 700 in selecting security responses depending on security functions logged and sent to the server until the mobile server 700 auto-destruction.

Depending on the frequency, repetitiveness or intensity of attempted intrusions, the mobile server 700 executes determined counter-measures. These counter-measures comprise, for instance:
  closing at least one communication channel with the third device,
  triggering a visual or sound alert, on the mobile server 700 or on a terminal, signaling the detection of a risk of intrusion and/or
  Transmitting an alert to a distant server signaling the detection of a risk of intrusion, the server being capable of return, in response, a command to trigger an action by the mobile server 700.

If the mobile server detects that the intrusion attempt has been occurring for a first determined duration, in absence of counter-order from a server or a user, the mobile server 700 wipes the data stored in its memory. If the mobile server detects that the intrusion attempts has been occurring for a second duration of time, greater than the first amount of time, in absence of a counter-order from the server or a user, the mobile server 700 releases the electrical current stored in the unit 705 and direct it to the processor or a memory of the mobile server 700, or even the third device connected to the mobile server 700.

Therefore, in certain embodiments, upon the detection of a first anomaly the mobile server is deactivated logically and upon detection of a second anomaly, subsequent to the first anomaly, the electricity stored in the storage unit 705 is transmitted to each electronic circuit of the mobile server 700 to be destroyed.

In addition to these embodiments, the stored electricity can also be transmitted to the device sending access requests to the protected mobile server, in order to zap the circuits of the said device.

In certain embodiments, the electricity stored in the storage unit 705 is transmitted to each said circuit upon the determination, by a detection means 710 of integrity anomaly of the mobile server, of the presence of an integration anomaly.

This integrity anomaly is, for instance, the detection of the housing being opened by a user. The means of detection 710 is then, for instance, a switch. Another integrity anomaly is, for instance, a contact of a circuit with a foreign object, via measurement of electrical currents or magnetic fields by the means of detection 710 for instance. Note that the characteristics listed next to FIGS. 1 to 5 and 7 to 8 are compatible with this embodiment.

In certain embodiments, the mobile server 700 comprises a memory 715 of crypted information.

In certain embodiments, the mobile server 700 comprises a means 720 of decrypting the information stored in the memory 715 depending on a decryption key.

This means 720 of decryption is for instance an embedded software.

In certain embodiments, the mobile server 700 comprises a means 115 of reception of a decryption key coming from the terminal. This means 115 of reception is for instance comprised of a wired connection connecting the mobile server 700 to the terminal.

In certain embodiments, the mobile server 700 comprises a means 120 of reception of a decryption key coming from a distant server. This means 120 of reception is for instance comprised of the wireless connection connecting the mobile server 700 to the internet.

In certain embodiments, the mobile server 700 comprises a means 115 and a means 120 of reception of a first key coming from the terminal and a second key coming form a distant server, a means 720 of pairing the two keys to form a hybrid decryption key utilized by the means of decryption.

The means 720 of pairing is for instance an embedded software. In certain variants, each decrypts a different portion of the data. In other variant the two keys are used alternatively to decrypt the data.

In certain embodiments, the mobile server 700 comprises a means 135 of geo-localizing the mobile server, the means 720 of decryption being configured to operate depending on the geo-localization supplied by the means of geo-localization and a geo-localization data associated with the data stored in memory 715.

In certain embodiments, the means 720 of decryption is configured to function depending on a clock data of the mobile server, and of a timestamp data associated with data stored in the memory 715.

Figure 7:
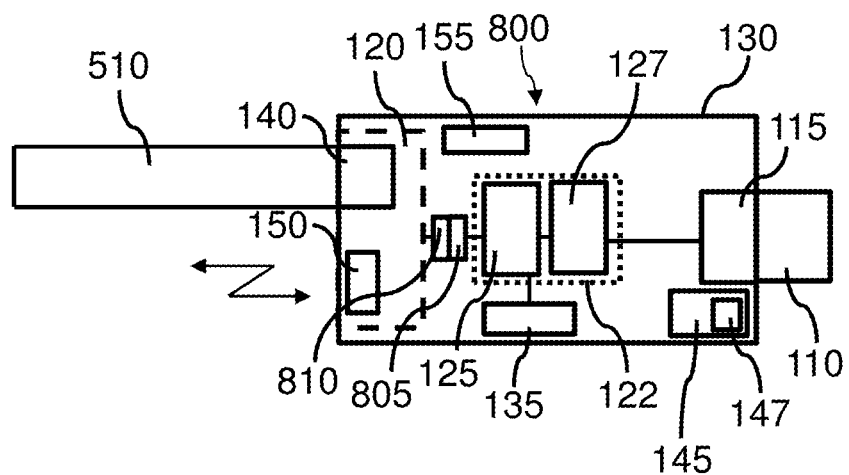
FIG. 7 represents, schematically, a fifth specific embodiment of the mobile server, object of the current invention.

FIG. 7 depicts a specific embodiment of the portable mobile server 800 communication with a data storage mobile server or with a data network 105 utilizing the internet protocol, comprising:
  a connector 110 to mechanically connect and establish a removable wired communication between the mobile server and the host computer,
  a first means 115 of wired bidirectional communication with the host computer,
  a second means 120 of bidirectional communication with a data storage mobile server or a data network,
  a unit 122 securing the communication between the host computer and the data storage mobile server or the data network, this communication being established between the first and the second means of communication, the security unit 122 comprising a means 805 of encrypting data being transmitted by the second means of communication and a means 810 of decryption of data received by the second means of communication and
the means of communication and the security unit being embedded in a single housing 130 removable from the host computer.

In certain variants, the mobile server comprises a data storage memory in lieu of or in addition to the means of encryption 805 and decryption 810.

In certain embodiments, the data stored in the memory are erased upon the reception of a deletion command. This command is received for instance in lieu of update files.

In certain embodiments, the data stored in the memory are erased upon the mobile server 800 determining that the risk of intrusion is too great. To determine this risk, the mobile server 800 utilizes for instance an embedded software that detects a number of attempts to decode or access the mobile server protected by the mobile server 800. When this value is greater than a determined threshold during a given amount of time, the data is erased.

In variants, the stored data can be encoded by the mobile server 800 directly by utilizing a means of software encoding for instance, or upstream from the storage on the mobile server 800. If this data is encoded, the decryption can potentially be unavailable in the mobile server can be stored in a distant server instead. The data access in then contingent on accessing the distant server and thus an authentication stage with the server.

Hence, during data storage on the mobile server 800, the user can create access conditions to this data: supplemental password, dual physical authentication (NFC) plus also force all users to connect to decrypt this data. In these variants, part of the data encryption key can only be decrypted from a distant server.

In these variants le decryption is incomplete, the mobile server 800 needs therefore to be connected and secured to be able to recover the missing part of the key to decrypt the memory content of the mobile server 800. Preferably, the mobile server 800 erases the reconstituted key, the decrypted data being still accessible while the session continues, the end of the session resulting causing the relocking of the data and meaning a new connection would be needed to recover another portion of the key.

In addition to these conditions of authentication, space and/or temporal restrictions can be used as described next to FIG. 1. For instance, the device 800 can potential comprise a means of geo-localization (not depicted).

The means of encryption 805 and the means of decryption 810 are for instance electronic circuits configured to, depending on an encryption key, encrypt or decrypt data. The decryption key can, for instance, be a key of a private/public key pair shared with the server.

The mobile server preferably comprises several different physical and logical encryption mobile servers, activated by different means, for example to access certain encrypted information, the mobile server has only part of the key, the other part can be distributed on the reference servers, on a blockchain, etc, making it impossible to access the data without being online.

The mobile server can also comprise different secure and encrypted storage compartments that can also be physically different (several chipsets) and can be physically activated (real power or not) by the mobile server or by other means such as a server.

This variant "hides" storage devices (in relation to a directory).

Note that all characteristics listed next to FIGS. 1 to 6 and 8 are compatible with this embodiment.

Figure 8:
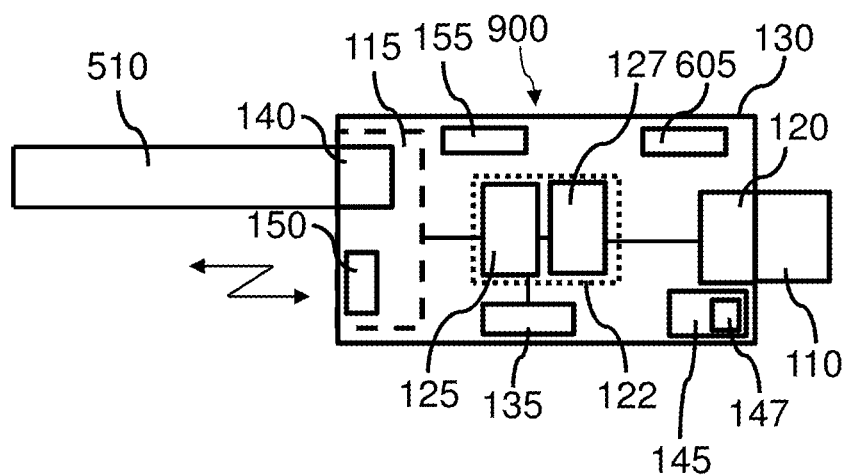
FIG. 8 represents, schematically, a sixth specific embodiment of the mobile server, object of the current invention.

FIG. 8 depicts a specific embodiment of the portable mobile server 900 communicating with a data storage mobile server or with a data network 105 utilizing the internet protocol, comprising:

- a connector 110 to mechanically connect and establish a removable wired communication between the mobile server and the host computer,
- a first means 115 of wired bidirectional communication with the host computer,
- a second means 120 of bidirectional communication with a data storage mobile server,
- a unit 122 securing the communication between the host computer and the data storage mobile server or the data network, this communication being established between the first and the second means of communication, the data being transmitted by the second means of communication and being associated with an identifier on a blockchain, this identifier being generated in relation with identifiers of the mobile server's electronic component and a unique predetermined identifier, and the means of communication and the security unit being embedded in a single housing 130 removable from the host computer.

Note that all characteristics listed next to FIGS. 1 through 7 are compatible with this embodiment.

The process to form an identifier on a blockchain is as follows: each electronic component of the mobile server 900 delivers a unique identifier defined by the manufacturer of said component. These identifiers are read out during the mobile server 900 provisioning either by the mobile server 900 or via the device used for assembling the process 900. The collection of these unique identifiers is used by an administration server to generate a unique identifier of this mobile server 900. An operating system is then installed on the mobile server 900, this operating system being paired with a unique identifier generated by the server. This identifier pair is used to generate a key, in the mobile server 900 that is part of a blockchain that will be integrated to the blockchain with its server and other similar mobile server 900. Each new mobile server 900 join a block chain; thus, when a mobile server 900 connects to the server, it is identified by the server and the other mobile server 900s before being completely operational$_{[MC2]}$.

In particular embodiments, a source server injects unique programming code and identifiers into a portable mobile server, some of these codes are the responsibility of the recipient client, (a first piece of information about this portable mobile server is added to the "client" blockchain). Then a provisioning server injects additional codes and adds additional blockchain information about the portable mobile server being configured onto the blockchain. At each step, the other members servers of this blockchain record and validate the information. The provisioning server informs the portable mobile server (and the blockchain) about its administration server. Thus all the servers of the blockchain know which administration server the portable mobile server will communicate with in the future and its block identifier in the chain. At its initialization, the portable mobile server, sends its first signature, but the other servers already knew about the portable mobile server due to the information injected by the servers during the preparation of the portable mobile server which they are already recognized in the blockchain of the company.

By this mechanism of portable mobile servers whose signature in the blockchain began during the creation of the portable mobile server and validated by the college of the members of the blockchain at each step, at its first start, and that integrates the blockchain, the portable mobile server is already recognized by the other members and authorized for communication and exchanges. In particular embodiments, during the manufacture of the mobile server, the mobile server is provided with unique identifiers relative to the mobile server. To function, the mobile server also requires unique identifiers relative to a user of the mobile server, such a company for example, which are not provided during manufacturing. Thus, should the mobile server get stolen between the places of production and use, the mobile server is unusable.

Once a user, sur as a company security manager, receives the manufactured mobile server, the mobile server must be connected to an initialisation server to receive the unique identifiers relative to the user and the company. This also inserts an identifier of the mobile server in a blockchain as well as provides the IP address of an administration server. The mobile server then connects to the administration server and is then fully operational.

In such embodiments, each module is unique, forgery-proof and is a block member of a chain. During the design of the module, identification elements of the components+ elements engraved during the design allow it to have a strong and unique identifier. This identifier becomes a block of the chain which is communicated by its initialization server to the other components of a fleet of mobile servers composing a private blockchain.

Once a college of fleet elements accepts it, it is part of this chain of blocks and at each connection it can only become operative after a quorum of the other members of the chain.

During its use it can feed the chain with blocks of events such as hacking attempts, connection habits.

The blockchain considered in this document can be of any type. Preferably, this blockchain is a private blockchain and the participants in this blockchain are limited to the mobile servers, administration servers, initialisation servers, manufacturing servers and, optionally, user-owned servers.

The mobile server 900 comprises preferably surveillance and archiving protocols as well as a machine-learning software to learn the difference between a password entry mistake and recurring attempts to access without user reaction to these queries (response to an alert, response to a security question—similar to PINs and PUKs—in a given timeframe).

If the mobile server 900 detects and interprets the absence of the user, the mobile server 900 starts preferably a protection procedure (data erase) followed by destruction, through electricity discharge, of vital components (memory and processors) and potentially a discharge on the Ethernet and USB ports that are used by the pirate third device.

Figure 2:
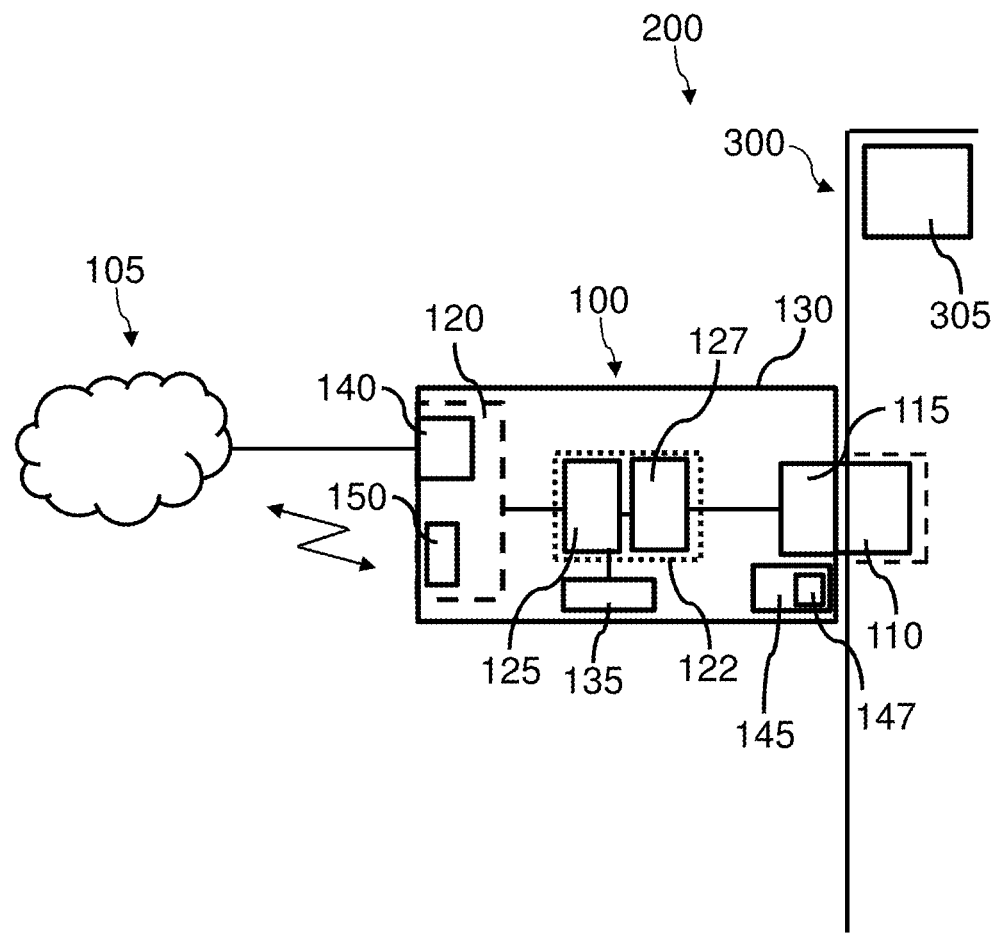
FIG. 2 represents, schematically, a specific embodiment, object of the current invention.

FIG. 2 depicts a schematic view of an embodiment of system 200, object of the present invention. This system 200 of protection of a host computer against intrusion comprises:
  a mobile server 100 as described next to FIGS. 1 through 8 and
  the host computer 300, connected, via a wire, to mobile server 100.

The connection between the mobile server 100 and the host computer 300 is made, via connections compatible with the USB standard, the mobile server 100 being equipped with a male USB plug and the terminal 300 being equipped with a female USB plug.

In the preferential embodiments such as the one depicted in FIG. 2, the host computer 300 is configured to deactivate at least one means 305 of wireless communication with the data network 105 when the mobile server is connected to the host computer.

The means 305 of communication is, for instance, an antenna configured for communications compliant with the Wi-Fi standard. The deactivation of this antenna causes the need for communications with the data network 105 to be undertaken via the mobile server 100. Hence, the communication between the host computer 300 and the data network 105 is secured as soon as the mobile server 100 is connected to the terminal 300.

Figure 3:
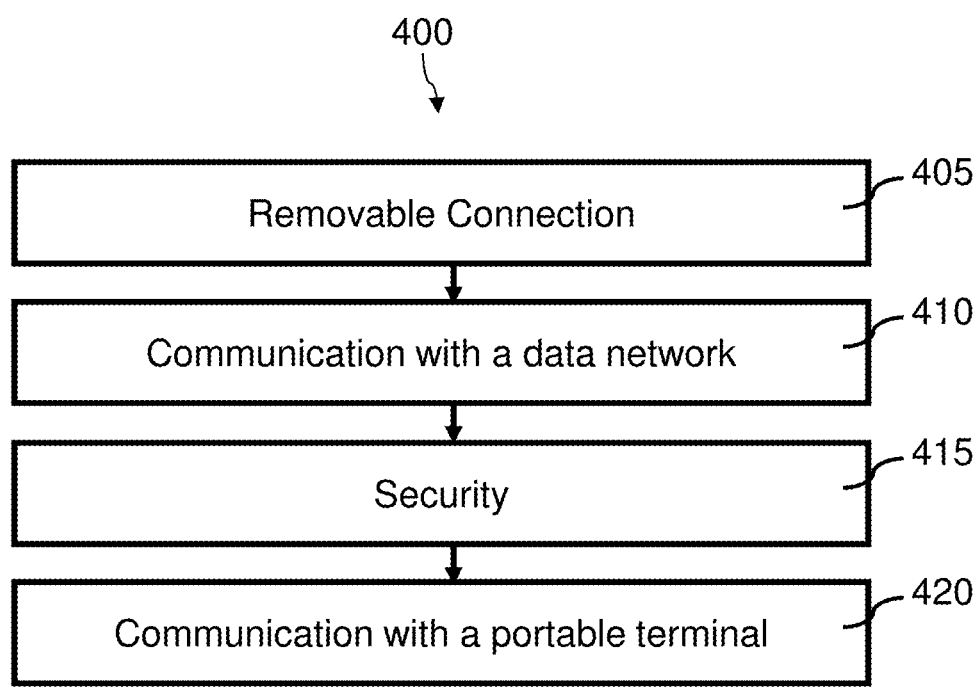
FIG. 3 represents, schematically and in the form of a flowchart, a series of specific stages of the process, object of the current invention

FIG. 3 depicts a specific flowchart of stages of the process 400, object of the present invention. This process 400 of communication with a data network utilizing the internet protocol comprises:
  a stage 405 of removable connection, to a host computer, of the removable housing of a mobile server such as the one described next to FIGS. 1 through 8, establishing a wired communication and the host computer,
  a first stage 410 of bidirectional communication, by the mobile server, with the data network,
  a stage 415 of protecting the communication between the host computer and the data network and
  a second stage 420 of wired bidirectional communication, with the host computer, of packets not filtered by the firewall.

This process 400 is carried out, for instance, by the mobile server 100, object of the present invention.

Preferably, upstream from the process 400, all the host computer connections to the data network are deactivated, by turning the airplane mode on, for instance. In certain variants, the terminal causes the deactivation of all these connections upon plugging in the mobile server to the terminal.

Upon the mobile server connection, the mobile server scans the points of access to the data network if this mobile server utilizes a first means of wireless connection.

Each point of access to the network is displayed on the host computer, via an internet browser for instance. Upon the selection of one of these access points by a user, the mobile server connects to the corresponding access point.

In certain variants, the mobile server activation requires entering an identifier and a password on the host computer.

Figure 9:
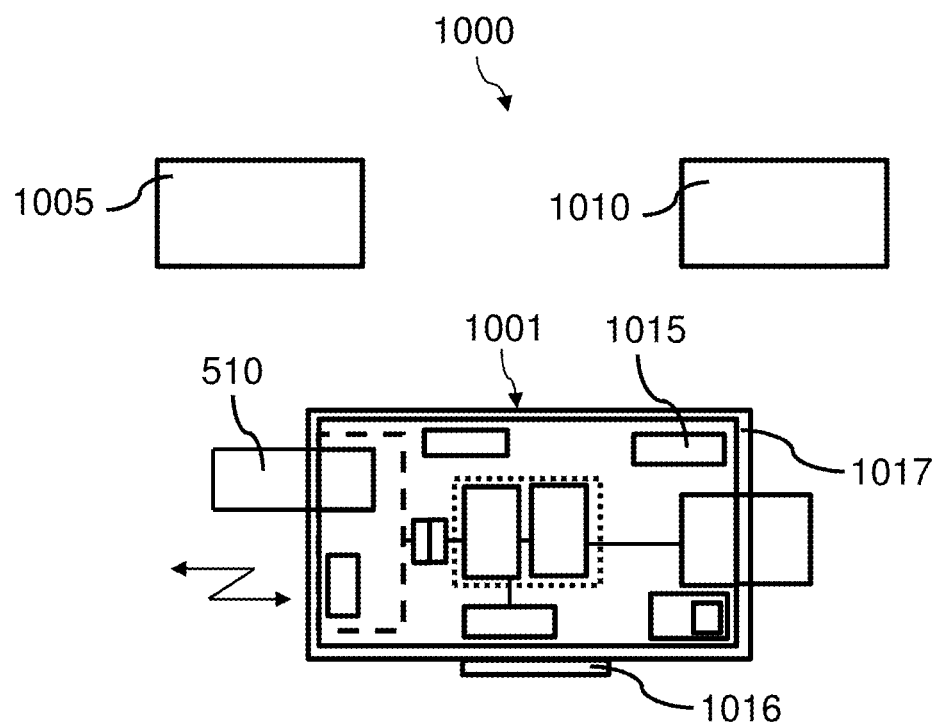
FIG. 9 represents, schematically, a first specific embodiment of the system, object of the current invention.

FIG. 9 schematically depicts a specific embodiment of a system 1000 of communication, object of the present invention. This system 1000 of communication comprises:
  at least one mobile server 1001 as described next to one of the FIGS. 1 through 8, comprising a means 510 of communication with a distant server,
  a provisioning server 1005 configured to be paired with at least one said mobile server and to supply to each said mobile server at least one information representing at least one information to connect to a communication server and
  a communication server 1010 configured to be connected with each said mobile server depending on at least one piece of communication data communicated by each said mobile server.

The provisioning server 1005 is configured to deliver at least one element of the following list:
  a connection identifier,
  an encryption protocol,
  a user attribution,
  a knowledge-base, comprising for instance, a DNS server identifier or a set of private connection codes for an organization,
  a block value in a blockchain and/or
  a path to a target communication server.

The mobile server 1001 can correspond to any type of mobile server illustrated near FIGS. 1 through 8.

In certain specific embodiments, the provisioning server 1005 and the communication server 1010 are merged.

In certain specific embodiments, the provisioning server 1005 is offline i.e. it is disconnected from any data network.

It is to be understood that, to function, the mobile server 1001 is connected to the provisioning server 1005 to receive information enabling the connection to the communication server 1010. This allows the provisioning server 1005 to control from a single point, or from a collection of provisioning servers 1005, a set of mobile server 10001.

In certain embodiments, the mobile server comprises a means 1016 of attaching to a terminal screen. This means of attachment is, for instance a magnet or any other method of attachment whether mechanical or magnetic.

Figure 10:
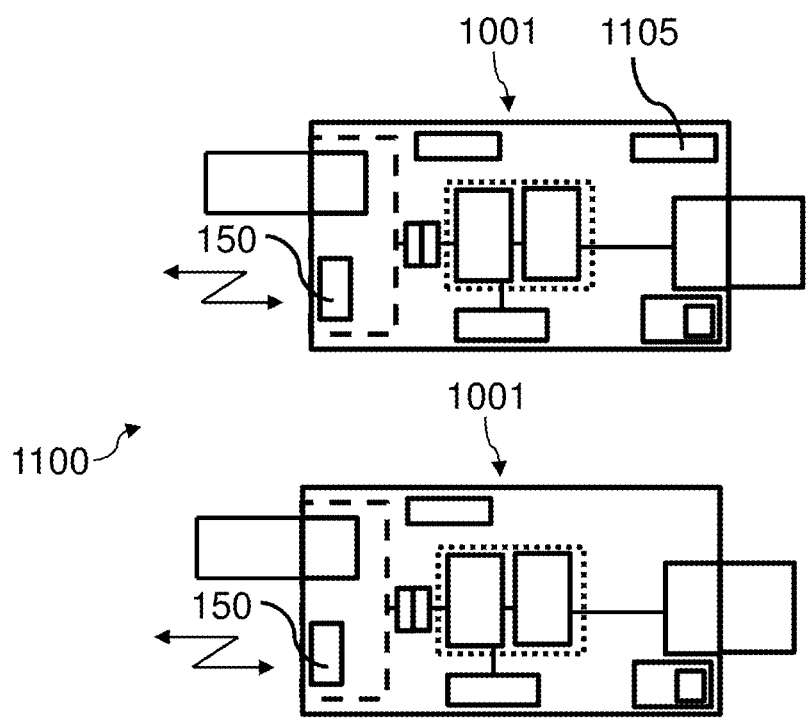
FIG. 10 represents, schematically, a second specific embodiment of the system, object of the current invention.

FIG. 10 depicts schematically an embodiment of a system 1100, object of the present invention. This system 1100 of communication between mobile servers, as described next to FIGS. 1 though 8, comprises:

- at least two mobile servers 1001, as described in one of the FIGS. 1 through 8, each mobile server incorporating at least one means of communication 150 with another mobile server 1001 and
- at least one means 1105 of granting access to at least one resource of a mobile server by at least one other mobile server.

The means 150 of communication is for instance an antenna to communicate over a wireless network such as WiFi network or Bluetooth.

The means 1105 of attribution is for instance an electronic circuit associated with the software of a terminal connected to a mobile server 1001 and allowing or not access to a resource of said mobile server. This access is a logical access and is unlocked by a user command.

In certain embodiments, the means 1105 of granting is configured to authorize access to at least one file stored on the mobile server 1001.

In certain embodiments, the means 1105 of granting provides administration rights of at least one file recorded to the mobile server 1001 to at least another mobile server 1001. These administrative rights correspond for instance to a right to write, read and/or delete.

In certain embodiments, the means 1105 of granting is configured to create an Information Technology tunnel from one mobile server 1001 to another mobile server 1001. It is to be reminded that a tunnel, in an Information Technology context, is the encapsulation of data of a network protocol in another in the same layer of the layer model, or in a higher-level layer.

Preferably, this layer is encrypted for instance via the SSH protocol.

In certain embodiments, at least one mobile server 1001 is registered in a blockchain.

In certain embodiments, the means 1105 of granting is configured to share a connection from one mobile server 1001 to another mobile server 1001. This mechanism is analogous to the connection sharing found in mobile phones.

In variants of one embodiment depicted in FIGS. 1 through 10, at least one mobile server 1001 comprises a database of identifiers and passwords of access points to a data network. This allows establishing a direct connection to WiFi access points for instance without user intervention.

In certain embodiments, at least one mobile server is configured to be connected to at least one third device, and to relay information sent by this device to a distant server.

Thus, the mobile server is connected to a device, preferably autonomous, such as device controlling access to a site or a control system such as sensors or cameras.

The mobile server can centralize the communication of other devices and then protect the collection of data for transmission to a server to maintain a distributed hardware architecture:

- on the one hand a server for the security and
- on the other hand, the user section, comprised for instance of a workstation, a data terminal, such as a terminal for identification, capture and acquisition of data or a keypad code or any other biometric recognition.

In these embodiments, the mobile server comprises a means of attaching to a terminal screen. In certain variants, this attachment is a magnet.

In certain embodiments, the mobile server is encased in a cellphone shell or in a tablet.

In certain embodiments of any variation of the mobile server disclosed above, the mobile server is made to never trust either the host computer nor ever trust the network nor any server linked to said mobile server as all those elements can be corrupt.

In such embodiments, habits of those elements are analyzed by an artificial intelligence and statistical and behavioral algorithms aimed at preventing and alerting to any risk or anomaly.

The result of any such analysis can be shared with an administration server and the rest of the fleet as part of a blockchain to feed the fleet's knowledge while compartmentalizing hazards which can be linked to the trust of a single central administration server (which in turn can be compromised).

By design the mobile server is made to not trust its host computer, nor the network to which the mobile server is connected, nor the administration server. However, the mobile server is made to trust its blockchain and thus analyses constantly each situation. Each communication is monitored to limit the risk of a security breach. Such experiences are stored within an internal memory as well as, preferably, on a blockchain. Thus two mobile servers can react to a different manner to the same situation.

Figure 11:
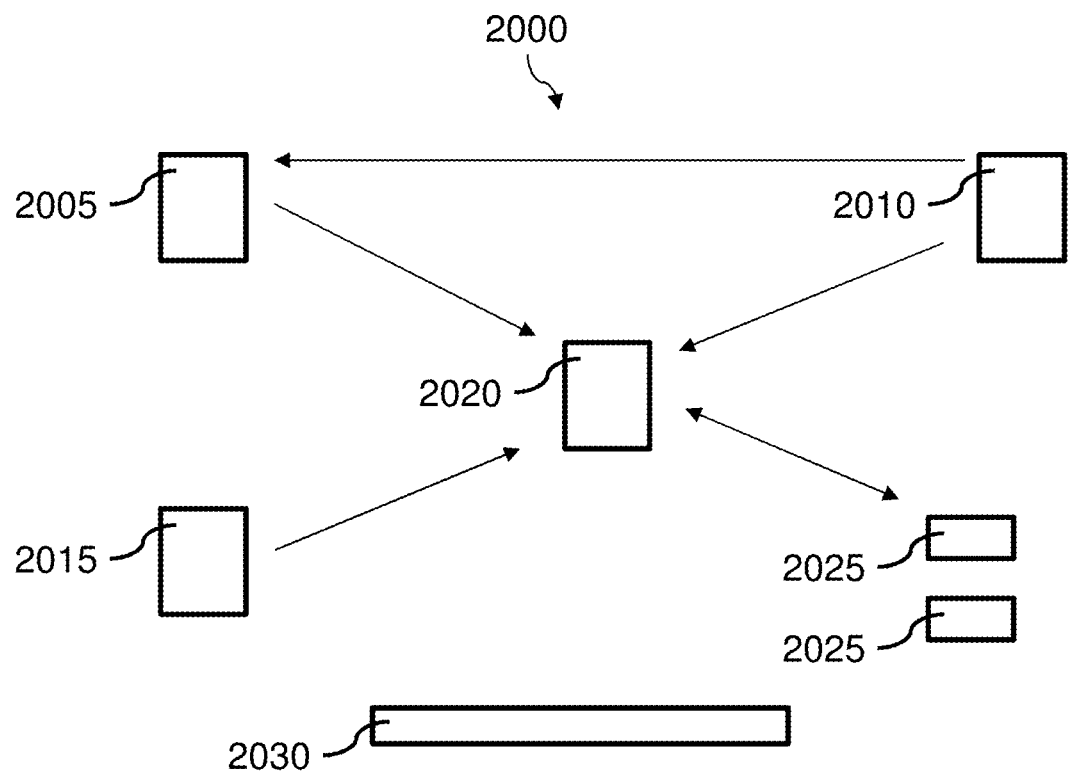
FIG. 11 represents, schematically, an architecture allowing for the secure provisioning and operation management of a fleet of portable mobile servers

FIG. 11 represents, schematically, an architecture 2000 suited to secure the provisioning and the operational management of a fleet of portable mobile servers such as disclosed in any embodiment of FIGS. 1 to 10 as well as any combination of features of such disclosures. This host computer securitization architecture 2000, comprises:

- an offline source server 2010,
- an offline provisioning server 2005 configured to connect with a portable mobile securitization server 2025 via a wired communication,
- an administration server 2020 configured to monitor and interact with at least one portable mobile securitization server,
- at least one portable mobile securitization server configured to connect via a wired communication to a host computer, said portable mobile securitization server comprising:
  - a connector to mechanically connect and establish a removable wired communication between the mobile server and the host computer,
  - a first wired bidirectional communicator with the host computer,
  - a second of bidirectional communicator with a data storage peripheral or a data network and
  - a unit securing the communication between the host computer and the data storage mobile server or the data network, this communication being established between the first and the second communicator,
- a blockchain 2030 comprising a block identifying each source-code, provisioning, administration and portable mobile securitization server.

The provisioning or initialisation server 2005 is configured to provide a connected portable mobile server 2025 with:

certificates and unique signatures and identifiers,
optionally, a block-identifier on a blockchain of the architecture 2000 and
data relative to the administration server 2020 to which the portable mobile server 2025 is bound.

This provisioning or initialisation server 2005 is also configured to send to the administration server 2020 data relative to initialised portable mobile servers.

Preferably, the provisioning or initialisation server 2005 can only be linked to a portable mobile server through wired communications.

Preferably, the provisioning or initialisation server 2005 can be offline.

The user-owned server 2015 can be configured to provide content and data-elements to the administration server 2020 so that such content and data can be provided to portable mobile servers 2025.

The source server 2010 is an offline server and is the only server habilitated to create programming code, signature and encryption keys for the provisioning or initialisation server 2005, the administration server 2020 and the fleet of portable mobile servers 2025. The source server 2010 is the server generating the only signature allowing the modification of the embedded code in other parts of the architecture 2000.

The administration server 2020 is the server communicating at all times with the portable mobile servers 2025. The administration server 2020 sets and configures rights, authorizations, sends updates and certificates for the portable mobile servers 2025.

The administration server 2020 can also send self-destruct instructions to portable mobile servers 2025 as well as check internet connection attempts made by the portable mobile servers 2025 or provide the network address linked to a domain name requested by a portable mobile server 2025.

Furthermore, preferably, all the elements of the architecture 2000 interact with a certification blockchain comprising identifiers of all such elements$_{[U3]}$.

In particular embodiments, at each step of configuring a portable mobile server:
  a block on the blockchain 2030, representative of the configured portable mobile server 2025, is updated with identifiers representative of the configuration performed on the portable mobile server and
  a portable mobile server 2025 signature, representative of the an identifier of the updated block, is stored in the portable mobile server.

In particular embodiments, during preparation of a portable mobile server 2025:
  the source server 2010 provides the portable mobile server with programmable code and unique identifiers and creates a block, representative of the portable mobile server on the blockchain, comprising at least one unique identifier,
  the provisioning server 2005 provides the portable mobile server with execution parameters and unique identifiers and provides the portable mobile server block with at least one identifier and execution parameter as well as provides the portable mobile server with a signature corresponding to its block identifiers and
  the administration server 2020 provides the portable mobile server with further execution parameters and unique identifiers and provides the portable mobile server block with at least one identifier and execution parameter, thus altering a block hash and identifier as well as the portable mobile server signature.

Figure 12:
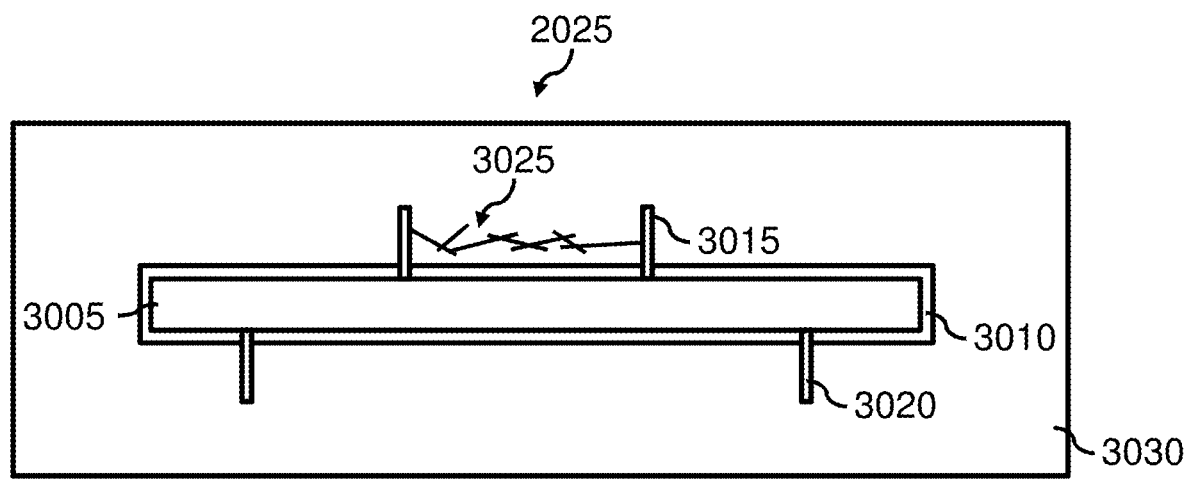
FIG. 12 represents, schematically, a specific embodiment of a portable mobile server.

In particular embodiments, electronic circuits 3005 of the portable mobile servers 2025 are immerged in a blackout varnish 3010, impermeable and insulating. Such an embodiment is shown in FIG. 12.

In particular embodiments, a portable mobile server 2025 comprises at least three pins, 3015 and 3020, stemming from the electronics and protruding from the varnish 3010, as well as conducting wires 3025 distributed randomly between at least two pins 3015, and an electromagnetic insulating and electrically conducting resin 3030 embedding the electronics, wires, varnish and pins.

In particular embodiments, a portable mobile server 2025 comprises an electric resistance measurement unit configured to measure the resistance between the two pins 3015 linked by the randomly distributed wires 3025 on one hand and between two pins 3020 not linked by randomly distributed wires on the other hand, such resistance measurements being stored on the blockchain at initialization of the portable mobile server 2025.

In particular embodiments, a portable mobile server 2025 comprises a self-destruct mechanism triggered by the electric resistance measurement unit when at least one of the measured resistances exceeds a difference threshold between the value measured and the initially stored values on the blockchain.

In particular embodiments, a portable mobile server 2025 comprises a electrical power storage unit connected to at least one electronic circuit of the mobile server and configured, when electricity is transmitted to each said circuit, to cause the destruction of each said circuit.

In particular embodiments, the electricity stored in the storage unit is transmitted to each said circuit depending on a command received via the second communicator.

In particular embodiments, the electricity stored in the storage unit is transmitted to each said circuit when a detector to detect an integrity anomaly of the mobile server detects the presence of an integrity anomaly.

In particular embodiments, the means of anomaly detection is, at least in part, mechanical or optoelectrical.

In particular embodiments, the electricity stored in the storage unit is transmitted to each said circuit when a means of detection at least in part, implemented in software.

In particular embodiments, the detection of a first anomaly, the mobile server 2025 is deactivated logically, and during the detection of a second anomaly, subsequent to the first anomaly, the electricity stored in storage unit is transmitted to each electronic circuit of the mobile server to be destroyed.

In particular embodiments, a portable mobile server 2025 comprises a memory of crypted data.

In particular embodiments, a portable mobile server 2025 comprises a decryptor for decrypting the information stored in the memory depending on a decryption key.

In particular embodiments, a portable mobile server 2025 comprises a receptor for reception of a decryption key coming from the host computer.

In particular embodiments, a portable mobile server 2025 comprises a receptor for reception of a decryption key coming from a distant server.

In particular embodiments, a portable mobile server 2025 comprises a receptor for reception of a first decryption key coming from the terminal and a second key coming from a distant server and a pair configurator of pairing the two keys to form a hybrid decryption key utilized by the decryptor.

In particular embodiments, a portable mobile server comprises 2025 a geo-locator for geo-localizing the mobile server, the decryptor being configured to function depending on the localization information supplied by the means of geo-localization and geo-localization data associated with the data stored in the memory.

In particular embodiments, the provisioning server 2005 is configured to provide to a portable mobile server at least one element of the following list:
- a connection identifier,
- an encryption protocol,
- a user attribution,
- a knowledge-base, comprising for instance, a DNS server identifier or a set of private connection codes for an organization,
- a block value in a blockchain and/or
- a path to a target administration server.

The invention claimed is:

1. Host computer securitization architecture, which comprises:
- an offline source server,
- an offline provisioning server configured to connect with a portable mobile securitization server via a wired communication,
- an administration server configured to monitor and interact with at least one portable mobile securitization server,
- at least one portable mobile securitization server configured to connect via a wired communication to a host computer, said portable mobile securitization server comprising:
  - a connector to mechanically connect and establish a removable wired communication between the mobile server and the host computer,
  - a first wired bidirectional communicator with the host computer,
  - a second of bidirectional communicator with a data storage peripheral or a data network and
  - a unit securing the communication between the host computer and the data storage mobile server or the data network, this communication being established between the first and the second communicator,
- a blockchain comprising a block identifying each source-code, provisioning, administration and portable mobile securitization server, wherein the provisioning server is configured to provide to a portable mobile server at least one element of the following list:
- a connection identifier,
- an encryption protocol,
- a user attribution,
- a knowledge-base, comprising for instance, a DNS server identifier or a set of private connection codes for an organization,
- a block value in a blockchain and/or
- a path to a target administration server.

2. Host computer securitization architecture according to claim 1, in which, at each step of configuring a portable mobile server:
- a block on the blockchain, representative of the configured portable mobile server, is updated with identifiers representative of the configuration performed on the portable mobile server and
- a portable mobile server signature, representative of the an identifier of the updated block, is stored in the portable mobile server.

3. Host computer securitization architecture according to claim 2, in which, during preparation of a portable mobile server:
- the source server provides the portable mobile server with programmable code and unique identifiers and creates a block, representative of the portable mobile server on the blockchain, comprising at least one unique identifier,
- the provisioning server provides the portable mobile server with execution parameters and unique identifiers and provides the portable mobile server block with at least one identifier and execution parameter as well as provides the portable mobile server with a signature corresponding to its block identifiers and
- the administration server provides the portable mobile server with further execution parameters and unique identifiers and provides the portable mobile server block with at least one identifier and execution parameter, thus altering a block hash and identifier as well as the portable mobile server signature.

4. Host computer securitization architecture according to claim 1, in which electronic circuits of the portable mobile servers are immerged in a blackout varnish, impermeable and insulating.

5. Host computer securitization architecture according to claim 4, in which a portable mobile server comprises at least three pins stemming from the electronics and protruding from the varnish, as well as conducting wires distributed randomly between at least two pins, and an electromagnetic insulating and electrically conducting resin embedding the electronics, wires, varnish and pins.

6. Host computer securitization architecture according to claim 5, in which a portable mobile server comprises an electric resistance measurement unit configured to measure the resistance between the two pins linked by the randomly distributed wires on one hand and between two pins not linked by randomly distributed wires on the other hand, such resistance measurements being stored on the blockchain at initialization of the portable mobile server.

7. Host computer securitization architecture according to claim 6, in which a portable mobile server comprises a self-destruct mechanism triggered by the electric resistance measurement unit when at least one of the measured resistances exceeds a difference threshold between the value measured and the initially stored values on the blockchain.

8. Host computer securitization architecture according the claim 1, in which a portable mobile server comprises a electrical power storage unit connected to at least one electronic circuit of the mobile server and configured, when electricity is transmitted to each said circuit, to cause the destruction of each said circuit.

9. Host computer securitization architecture according to claim 8, in which the electricity stored in the storage unit is transmitted to each said circuit depending on a command received via the second communicator.

10. Host computer securitization architecture according to claim 8, in which the electricity stored in the storage unit is transmitted to each said circuit when a detector to detect an integrity anomaly of the mobile server detects the presence of an integrity anomaly.

11. Host computer securitization architecture according to claim 8, in which the detector is, at least in part, mechanical or optoelectrical.

12. Host computer securitization architecture according to claim 8, in which the electricity stored in the storage unit is transmitted to each said circuit when a detector at least in part, implemented in software.

13. Host computer securitization architecture according to claim 8, in which, during the detection of a first anomaly, the mobile server is deactivated logically, and during the detection of a second anomaly, subsequent to the first anomaly, the electricity stored in storage unit is transmitted to each electronic circuit of the mobile server to be destroyed.

14. Host computer securitization architecture according to claim 1, in which a portable mobile server comprises a memory of crypted data.

15. Host computer securitization architecture according to claim 14, in which a portable mobile server comprises a decryptor for decrypting the information stored in the memory depending on a decryption key.

16. Host computer securitization architecture according to claim 15, in which a portable mobile server comprises a receptor for reception of a decryption key coming from the host computer.

17. Host computer securitization architecture according to claim 15, in which a portable mobile server comprises a receptor for reception of a decryption key coming from a distant server.

18. Host computer securitization architecture according to claim 15, in which a portable mobile server comprises a receptor for reception of a first decryption key coming from the terminal and a second key coming from a distant server and a pair configurator of pairing the two keys to form a hybrid decryption key utilized by the decryptor.

19. Host computer securitization architecture according to claim 15, in which a portable mobile server comprises a geo-locator for geo-localizing the mobile server, the decryptor being configured to function depending on the localization information supplied by the means of geo-localization and geo-localization data associated with the data stored in the memory.

* * * * *